United States Patent [19]

Yoshida et al.

[11] E Re. 29,740

[45] Reissued Aug. 22, 1978

[54] COLOR CATHODE RAY TUBE OF THE PLURAL BEAM, SINGLE ELECTRON GUN TYPE

[75] Inventors: Susumu Yoshida; Akio Ohgoshi, both of Tokyo; Senri Miyaoka, Zushi; Minoru Morio, Tokyo, all of Japan

[73] Assignee: Sony Corporation, Tokyo, Japan

[21] Appl. No.: 737,660

[22] Filed: Nov. 1, 1976

Related U.S. Patent Documents

Reissue of:

[64] Patent No.: 3,548,249
Issued: Dec. 15, 1970
Appl. No.: 796,838
Filed: Feb. 5, 1969

[30] Foreign Application Priority Data

Feb. 5, 1968 [JP] Japan ..... 43-6857

[51] Int. Cl.[2] ..... H01J 29/70; H01J 29/76

[52] U.S. Cl. ..... 315/368; 315/13 C; 313/412; 313/428

[58] Field of Search ..... 315/13 C, 13 CG, 368; 313/412, 413, 428

[56] References Cited

U.S. PATENT DOCUMENTS

| | | | |
|---|---|---|---|
| 2,925,542 | 2/1960 | Gethmann | 335/213 |
| 3,188,508 | 6/1965 | Thomas | 315/13 C |
| 3,307,067 | 2/1967 | Jachim et al. | 315/13 X |
| 3,430,099 | 2/1969 | Ashley | 315/13 C |
| 3,448,316 | 6/1969 | Yoshida et al. | 313/412 |
| 3,505,560 | 4/1970 | Marvin | 315/412 |

*Primary Examiner*—Maynard R. Wilbur
*Assistant Examiner*—T. M. Blum
*Attorney, Agent, or Firm*—Lewis H. Eslinger; Alvin Sinderbrand

[57] ABSTRACT

A color cathode ray tube preferably of the single gun, plural beam type wherein the beams originate on a horizontal or vertical straight line and are directed into a field produced by a horizontal-vertical electromagnetic deflection yoke at predetermined incident angles to each other so as to converge at a color screen, is provided with a magnetic yoke, for example, secured to the electron beam convergence plates at the end of the electron gun so as to be disposed in the path of the leakage flux produced by the horizontal-vertical electromagnetic deflection yoke, and thereby impart a further vertical or horizontal deflection field to at least one of the plural beams for correcting a deviation between the positions of rasters on the color screen produced by the plural beams.

9 Claims, 8 Drawing Figures

COLOR CATHODE RAY TUBE OF THE PLURAL BEAM, SINGLE ELECTRON GUN TYPE

Matter enclosed in heavy brackets [ ] appears in the original patent but forms no part of this reissue specification; matter printed in italics indicates the additions made by reissue.

This invention relates generally to color picture tubes of the single-gun, plural-beam type, and particularly to tubes of that type in which the plural beams are passed through the optical center of a common electron lens by which the beams are focussed on the color phosphor screen.

In single-gun, plural beam color picture tubes of the described type, for example, as specifically disclosed in the copending U.S. application Ser. No. 607,414, filled Jan. 12, 1968, now Pat. No. 3,448,316, and having a common assignee herewith, three laterally spaced electron beams are emitted or origniated by a beam generating or cathode assembly and directed in a common substantially horizontal or vertical plane with the central beam coinciding with the optical axis of the single electron lens and the two outer beams being converged to cross the central beam at the optical center of the lens and thus emerge from the latter along paths that are divergent from the optical axis. Arranged along such divergent paths are pairs of convergence deflecting plates having voltages applied thereacross to deflect the divergent beams substantially in the plane of origination thereof for causing all beams to converge at a point on the apertured beam selecting grid or shadow mask associated with the color screen. After passing between the convergence deflecting plates, the beams are acted upon by the magnetic fields resulting from the application of horizontal and vertical sweep signals to the corresponding coils of a deflection yoke, whereby the beams are made to scan the screen in the desired raster. It will be apparent that, when the three beams are decected by the yoke from a point of convergence at the center of the screen, as during scanning, the distances that such beams travel through the magnetic fields of the deflection yoke are relatively varied and spherical aberration results, that is, the beams undergo different degrees of deflection resulting in misconvergence of the beams, particularly when the latter are directed at corner portions of the screens.

Although certain aspects of the above described misconvergence can be corrected by suitably shaping and dimensioning the horizontal and vertical deflection coils, for example, as hereinafter described in detail, there remains a deviation of the raster in the central beam with respect to the rasters of the other two beams, particularly at the top and bottom of the screen in the case of the beams originating in a horizontal plane.

Accordingly, it is an object of this invention to avoid the above mentioned deviation of the rasters from each other, particularly at the top and bottom of the screen of a color picture tube of the described type, without resorting to complex dynamic convergence devices for that purpose.

Another object is to achieve the desired registration of the rasters by subjecting one or more of the electron beams to a correction field which is not applied to the remainder of the electron beams.

A further object is to produce the correction field for achieving registration of the rasters by collecting leakage flux from the deflection yoke and concentrating the collected flux in a space through which one, for example, the central, electron beam passes, whereby to impart an additional deflection to the central beam.

In accordance with an aspect of this invention, a single-gun, plural-beam color picture tube, as described, is provided with magnetic yoke members disposed at opposite sides of the path of the central beam, preferably at the entrance for the latter between the convergence deflecting plates, and each of the yoke members has a straight portion extending at right angles to the plane in which the beams originate and being disposed between the central beam and the adjacent side beam, with end portions provided on the ends of the straight portion and extending at substantial angles to the latter in directions away from the central beam to act as pole pieces for collecting leakage flux from the deflection yoke coil intended to deflect the beams at right angles to said plane, with the collected flux being concentrated in the space between the straight portions of the yoke members and hence acting on the central beam passing through such space.

The above, and other objects, features and advantages of this invention, will become apparent from the following detailed description of an illustrative embodiment which is to be read in conjunction with the accompanying drawings, in which.

In order to provide a better understanding of the present invention, a three-beam single-gun type color cathode ray tube of the type to which this invention may be applied is described below.

Figure 1:
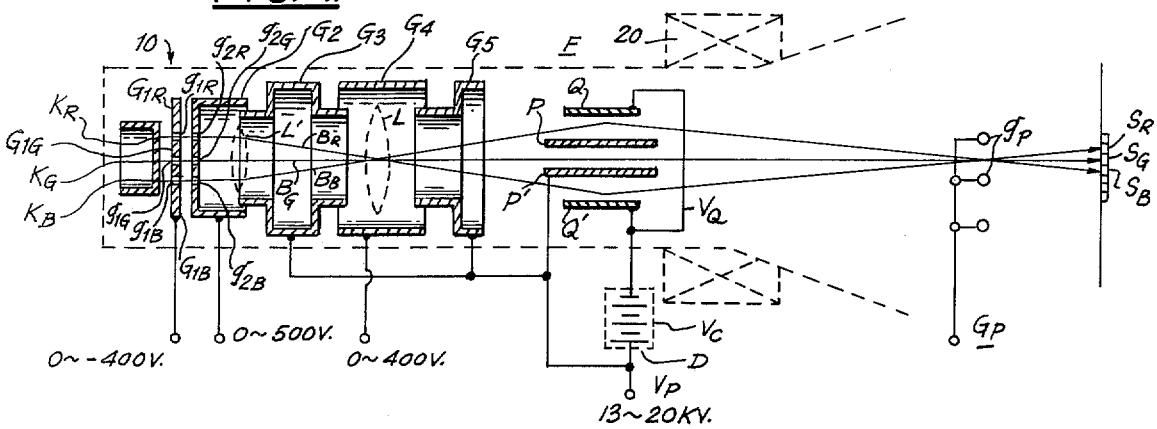
FIG. 1 is a schematic horizontal cross-sectional view showing a plural-beam, single-electron gun type color cathode ray tube of the type to which the present invention can be applied.

Referring to the drawings, and initially to FIG. 1 thereof, it will be seen that the single-gun plural-beam color picture tube 10 there shown may comprise a glass envelope (shown in dotted line) having a neck, and a cone extending from the neck to a color screen S provided with the usual arrays of color phosphors $S_R$, $S_G$, and $S_B$, and with an aperture beam selecting grid or shadow mask $G_P$. Disposed within the neck is a single electron gun having cathodes $K_R$, $K_G$, and $K_B$, each of which is constituted by a beam-generating source with the respective beam-generating surfaces thereof disposed as shown in a plane which is substantially perpendicular to the axis of the electron gun. In the embodiment shown, the beam-generating surfaces are arranged in a straight line so that the respective beams $B_R$, $B_G$, and $B_B$ emitted therefrom are directed in a substantially horizontal plane containing the axis of the gun, with the central beam $B_G$ being coincident with such axis. A first grid $G_1$ is spaced from the beam-generating surfaces of cathodes $K_R$, $K_G$, and $K_B$ and has apertures $g_{1R}$, $g_{1G}$, and $g_{1B}$ formed therein in alignment with the respective cathode beam-generating surfaces. A common grid $G_2$ is spaced from the first gird $G_1$ and has apertures $g_{2R}$, $g_{2G}$, and $g_{2B}$ formed therein in alignment with the respective apertures of the first grid $G_1$. Successively arranged in the axial direction away from the common grid $G_2$ are open-ended, tubular grids or electrodes $G_3$, $G_4$, and $G_5$ respectively, with cathodes $K_R$, $K_G$, and $K_B$, grids $G_1$ and $G_2$, and electrodes $G_3$, $G_4$, and $G_5$ being maintained in the depicted assembled positions thereof, by suitable, non-illustrated support means of an insulating material.

For operation of the electron gun of FIG. 1, appropriate voltages are applied to the grids $G_1$ and $G_2$ and to the electrodes $G_3$, $G_4$, and $G_5$. Thus, for example, a voltage of 0 to minus 400 v. is applied to the grid $G_1$, a voltage of 0 to 500 v. is applied to to the grid $G_2$, a voltage of 13 to 20 kv. is applied to the electrodes $G_3$ and $G_5$, and a voltage of 0 to 400 v. is applied to the electrode $G_4$ with all of these voltages being based upon the cathode voltage as a reference. As a result, the voltage distributions between the respective electrodes and cathodes, and the respective lengths and diameters thereof, may be substantially identical with those of a unipotential-single beam type electron gun which is constituted by a single cathode and first and second, single-aperture grids.

With the applied voltage distribution as described hereinabove, an electron lens field will be established between grid $G_2$ and the electrode $G_3$ to form an auxiliary lens L′ as indicated in dashed lines, and an electron lens field will be established around the axis of the electrode $G_4$, by the electrodes $G_3$, $G_4$, and $G_5$, to form a main lens L, again as indicated in dashed lines. In a typical use of electron gun A, bias voltages of 100 v., 0 v., 300 v., 30 kv., 200 v., and 20 v. may be applied respectively to the cathodes $K_R$, $K_G$, and $K_B$, the first and second grids $G_1$ and $G_2$ and the electrodes $G_3$, $G_4$, and $G_5$.

Further included in the electrode gun of FIG. 1 are electron beam convergence deflecting means F which comprise shielding plates P and P′ disposed in the depicted spaced, relationship at opposite sides of the gun axis, and axially extending, deflector plates Q and Q′ which are disposed, as shown, in outwardly spaced, opposed relationship to shielding plates P and P′, respectively. Although depicted as substantially straight, it is to be understood that the deflector plates Q and Q′ may, alternatively, be somewhat curved or outwardly bowed, as is well known in the art.

The shielding plates P and P′ are equally charged and disposed so that the central electron beam $B_G$ will pass substantially undeflected between the shielding plates P and P′, while the deflector plates Q and Q′ have negative charges with respect to the plates P and P′ so that respective electron beams $B_B$ and $B_R$ will be convergently deflected as shown by the respective passages thereof between the plates P and Q and the plates P′ and Q′. More specifically, a voltage $V_P$ which is equal to the voltage applied to the electrode $G_5$, may be applied to both shielding plates P and P′, and a voltage $V_Q$, which is some 200 to 300 v. lower than the voltage $V_P$, is applied to the respective deflector plates Q and Q′ so that respective shielding plates P and P′ are at the same potential, and a deflecting voltage difference, or convergence deflecting voltage is provided between the respective plates P′ and Q′ and P and Q. It is this convergence deflecting voltage $V_c$ which will impart the requisite convergent deflection to the respective electron beams $B_B$ and $B_R$. D is a static convergence voltage generating circuit which is applied between the electrode plates P and Q, and between the electrode plates P′ and Q′.

In operation, the respective electron beams $B_R$, $B_G$, and $B_B$ which emanate from the beam generating surfaces of the cathodes $K_R$, $K_G$, and $K_B$ will pass through the respective grid apertures $g_{1R}$, $g_{1G}$, and $g_{1B}$, to be intensity modulated with what may be termed "red," "green," and "blue" intensity modulation signals applied between the cathodes and the first grid $G_1$. The respective electron beams will then pass through the common auxiliary lens L′ to cross each other at the center of the main lens L and emerge from the latter with beams $B_R$ and $B_B$ diverging from beam $B_G$. Thereafter, the central electron beam $B_G$ will pass substantially undeflected between shielding plates P and P′ since the latter are at the same potential. When electron beam $B_B$ passes between plates P′ and Q′ and electron beam $B_R$ passes between plates P and Q, they will converge as a result of the convergence deflecting voltage applied therebetween. The system of FIG. 1 is so arranged that the electron beams $B_B$, $B_G$, and $B_R$ will desirably converge or cross each other at a common spot centered in an aperture between adjacent grid wires $g_p$ of the beam selecting grid or mask $G_P$ so as to diverge therefrom to strike the respective color phosphors of a corresponding array on screen S. More specifically, it may be noted that the color phosphor screen S is composed of a large plurality of sets or arrays of vertically extending "red," "green," and "blue" phosphor stripes or dots $S_R$, $S_G$, and $S_B$ with each of the arrays or sets of color phosphors forming a color picture element as in a chromatron type color picture tube. Thus, it will be understood that a common spot of beam convergence will correspond to one of the color picture elements.

The voltage $V_p$ may also be applied to the lens electrodes $G_3$ and $G_5$ and to the screen S as an anode voltage in a conventional manner through a non-illustrated graphite layer which is provided on the inner surface of the cone of the tube envelope. The grid wires of screen grid $G_P$ may have a post-focussing voltage ranging, for example, from 6 to 7 kv. applied thereto. Thus, to summarize the operation of the depicted color picture tube of FIG. 1, the respective electron beams $B_B$, and $B_G$, and $B_R$ will be converged at screen grid $G_P$ and will diverge therefrom in such manner that electron beam $B_B$ will strike the "blue" phosphor $S_B$, electron beam $B_G$ will strike the "green" phosphor $S_G$ and electron beam $B_R$ will strike the "red" phosphor $S_R$ of the array or set corresponding to the grid aperture at which the beams converge.

Electron beam scanning of the face of the color phosphor screen is effected in a conventional manner, for example, by horizontal and vertical electromagnetic deflection means 20 indicated in broken lines. Deflection means 20 may be constructed as a deflection yoke means having horizontal and vertical deflection coils wound in a saddle-like or toroidal form. By selecting the winding angle and position of the deflection coils so that a pin-cushion shaped horizontal deflection field is produced by the horizontal deflection coil and barrel shaped vertical deflection field is produced by the vertical deflection coil, it is possible to effect dynamic convergence by the magnetic field produced by the deflection yoke means, as described in detail in U.S. patent application Ser. No. 753,694, filed Aug. 19, 1968, now Pat. No. 3,500,114, and having a common assignee herewith.

Figure 2A:
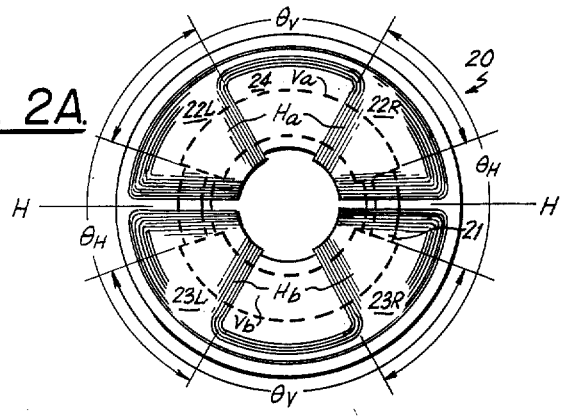
FIGS. 2A and 2B are front and side views showing the mechanical arrangement of deflection yoke means applicable to the color cathode ray tube of FIG. 1.
Figure 2B:
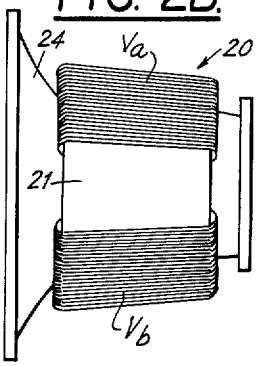

An example of a deflection yoke means capable of producing a pin-cushion shaped deflection field, and a barrel shaped vertical deflection field is shown at 20 in FIGS. 2A and 2B. In FIGS. 2A and 2B, a deflection yoke 21 is provided on a yoke supporting annular member 24 which is enlarged at its front end in the form of a funnel. A pair of vertical deflection coils $V_a$ and $V_b$ are symmetrically wound in a toroidal form on deflection yoke 21 with respect to horizontal plane H—H passing through the axis of the yoke. These vertical deflection coils are connected, for example, in series with each other. In order to produce a barrel shaped vertical deflection field, the winding angle $\theta_v$, at which the vertical deflection coils $V_a$ and $V_b$ are wound on the yoke 21, is selected to be greater than that which would produce a rectangular vertical deflection field. In the case of a uniformly distributed winding, the winding angle is set between 120° and 160°.

A pair of saddle-shaped horizontal deflection coils $H_a$ and $H_b$ extend within annular member 24 and are symmetrically located with respect to horizontal plane H—H. These horizontal deflection coils are connected, for example, in series with each other. In order to produce a pin-cushion shaped field, the left hand side effective coil portion 22L of horizontal deflection coil $H_a$, and the left hand side effective coil portion 23L of horizontal deflection coil $H_b$ are disposed in contact, or in closely spaced relationship with each other. Similarly, the right hand side effective coil portion 22R of coil $H_a$ and the right hand side effective coil portion 23R of coil $H_b$ are disposed in contact, or closely spaced relationship with each other. The winding angles $\theta_H$ of coil portions 22L and 23L, and of coil portions 22R and 23R are selected to be between 120° and 130°. The front portions of coils $H_a$ and $H_b$ adjacent the wide end of support 24 are constructed in the form of a winding represented by the nth power of the cosine, or $\cos^n$, where n is a positive number between 2 and 7. The rear portions of coils $H_a$ and $H_b$ are constructed in the form of a winding represented by the mth power of the cosine, or $\cos^m$, where m is a positive number between and 1 and 3.

With the above arrangement, even if horizontal and vertical convergence voltage and current generating circuits, and vertical convergence means are omitted, dynamic convergence in both the horizontal and vertical directions can be effected with respect to the three beams $B_R$, $B_B$, and $B_G$ when these beams are made to scan screen S.

Figure 3:
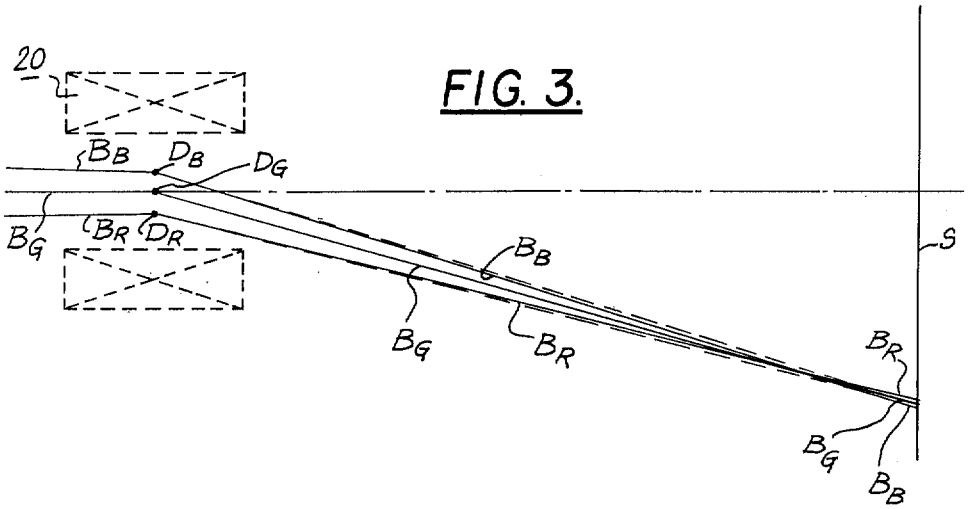
FIG. 3 is a diagrammatic view illustrating the manner in which the beams are deflected and converged.

The three beams $B_R$, $B_G$, and $B_B$, when being deflected horizontally and vertically are located in a common plane which is inclined with respect to the horizontal plane H—H through an angle corresponding substantially to the angle of vertical deflection, as the beams are always arranged on a substantially horizontal line. However, the three beams in the common plane enter into the deflection yoke means 20 at difference incident angles due to convergence means F. Thus, if the deflection yoke means of FIGS. 2A and 2B is not employed, there is a tendency that the three beams will cross each other at a position which is short of screen S when these beams are directed to the left or right hand side portion thereof. Thus, as diagrammatically shown in FIG. 3, beams $B_B$ and $B_R$ which are at the left and right of central beam $B_G$ at the deflection position shown, tend to land on screen S to the right and left, respectively, of beam $B_G$ when these beams are directed to the left hand side portion of the screen. However by using the deflection yoke means of FIGS. 2A and 2B, beam $B_B$ is deflected from its deflection center position $D_B$ across a minimum field position corresponding to deflection center position $D_G$, and $B_R$ is deflected from its deflection center position $D_R$ through a relative strong portion of the pin-cushion type field. Thus, the three beams can be made up to converge accurately with each other at the screen as shown by dotted lines in the drawing. For vertical deflections, if the deflection yoke means of FIGS. 2A and 2B is not used, the three beams tend to cross each other short of the screen at the opposite sides as in the horizontal deflection. By using the deflection yoke means of FIGS. 2A and 2B, however, the three beams are subjected to substantially the same component of a barrel type field so as to converge with each other at screen S, since they are not vertically spaced apart from each other.

Thus by winding the horizontal deflection coil in a saddle-like form, and by winding the vertical deflection coil in a toroidal form corresponding with the curved surface of screen S, vertical dynamic convergence can be effected without using any vertical dynamic convergence voltage and current generating circuits. The configurations of the pin-cushion and barrel magnetic fields can be determined by winding angle $\theta_v$ of vertical deflection coils $V_a$ and $V_b$ and their positions on yoke 21, and winding angle $\theta_H$ of horizontal deflection coils $H_a$ and $H_b$ and their positions within support 24. Thus, effective convergence can be achieved without providing dynamic convergence means as normally required by convention color cathode ray tubes, or on the other hand, more effective convergence can be obtained by using such dynamic convergence means at the same time.

The horizontal deflection coils in saddle-like form can be produced as easily as if they were wound in toroidal form. Furthermore, due to the fact that the horizontal deflection frequency is sufficiently higher than the vertical deflection frequency, power consumption for the deflection may be reduced to 60% of that required by horizontal deflection coils wound in toroidal form. Likewise, the power consumption of the vertical deflection coils would be higher if they were wound in a saddle-like form than in a toroidal form. Therefore, the horizontal deflection coils should be wound in a saddle-like form, and the vertical deflection coils in a toroidal form. Moreover, by winding the horizontal deflection coils in a saddle-like form, it is possible to easily change the configurations of the portion of the horizontal deflection field on the screen side and that on the electron gun side so that, for example, one of the field portions can be of the barrel type, while the other field portion is of the pin-cushion type, while the remainder of the horizontal deflection field is either a pin-cushion type or a barrel type field. This would become difficult to achieve if the horizontal deflection coils were wound in toroidal form.

Usually rasters appearing on the screen tend to be subjected to pin-cushion distortion due to the configuration of the screen in spite of setting the focussing adjustment to achieve the best possible beam focussing. However, by making the horizontal deflection field portion at the screen side to be pin-cushion shaped, and the horizontal deflection field on the electron gun side to be barrel shaped, in accordance with the saddle-like configuration of the horizontal deflection coils, it is possible to easily correct pin-cushion distortion of the rasters resulting from curvature of the screen.

Figure 4:
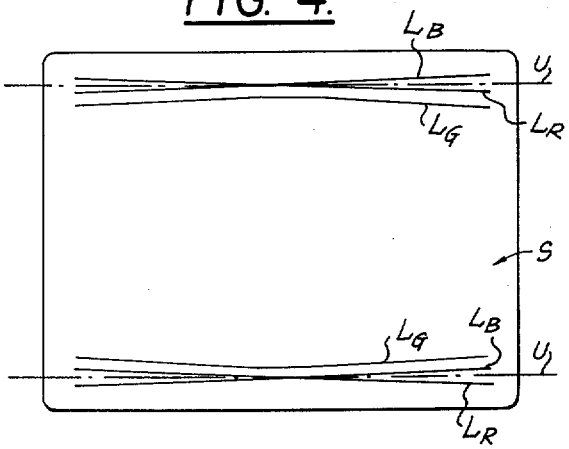
FIG. 4 is a diagrammatic view illustrating the manner in which rasters are formed and the deviations thereof to be corrected by this invention.

With the foregoing arrangement, however, the following undesirable effect is produced due to the fact that the vertical deflection field is of the barrel type configuration. When the three beams $B_R$, $B_G$, and $B_B$ originating in a common horizontal plane are vertically deflected to scan screen S at a high or low position, rasters $L_R$, $L_G$, and $L_B$ resulting from the "red," "green," and "blue"beams $B_R$, $B_G$, and $B_B$ should be located on a common horizontal line U as indicated in FIG. 4. However, it has been found that when rasters $L_R$ and $L_B$ resulting from side beams $B_R$ and $B_B$ are in registration with each other on the midpoint of horizontal line U, raster $L_R$ extending through the midpoint, tends to be slightly lowered on the right hand side. Raster $L_B$ also tends to be lowered at the left hand side, and raster $L_G$ resulting from center beam $B_G$ tends to be shifted closer to the center of screen S than rasters $L_R$ and $L_B$. It may be assumed that such tendency is mainly due to the fact that the vertical deflection field is barrel shaped as described above. If the vertical sweep voltage is given a suitable waveform, the described inclination of rasters $L_R$ and $L_B$ can be substantially eliminated or at least made negligible. However, it is relatively difficult, by such means, to eliminate the deviation between the positions of rasters $L_R$ and $L_B$ and the position of raster $L_G$.

In accordance with the present invention, there is provided a simple arrangement by which, even if a deviation which cannot be neglected occurs between the positions of rasters $L_R$ and $L_B$ and the positions of raster $L_G$, such a deviation can be easily eliminated. More specifically, the foregoing elimination of the deviation between raster $L_G$ and rasters $L_R$ and $L_B$ at the top and bottom of screen S is achieved by relatively increasing the magnetic field effect acting on center beam $B_G$ as compared with the magnetic field effect acting on beams $B_R$ and $B_B$. The relatively increased magnetic field effect is attained, for example, by providing a correcting magnetic field acting in the same direction as the vertical deflection field, in the case where the beams originate in a horizontal plane, and through which only the central beam $B_G$ is made to pass. When the invention is applied to a color cathode ray tube of the type shown on FIG. 1, the correcting magnetic field may be advantageously disposed at the entry for beam $B_G$ to the convergence deflecting means F.

Figure 5:
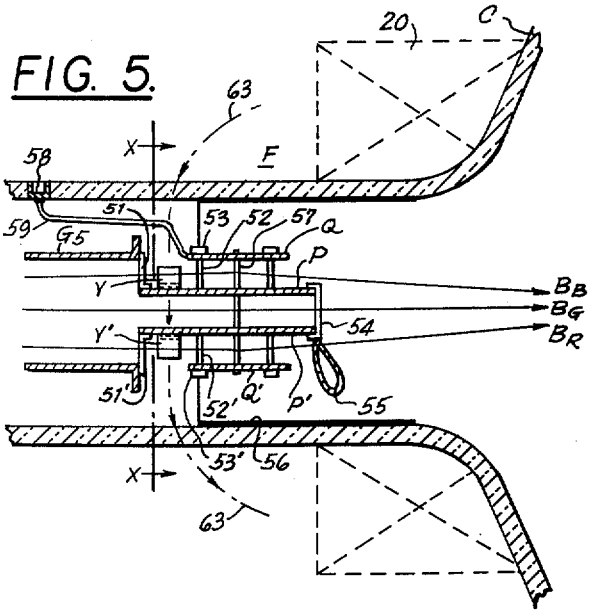
FIG. 5 is a horizontal cross-sectional view of the main portion of the color tube of FIG. 1, but shown with an embodiment of the present invention applied thereto.
Figure 6:
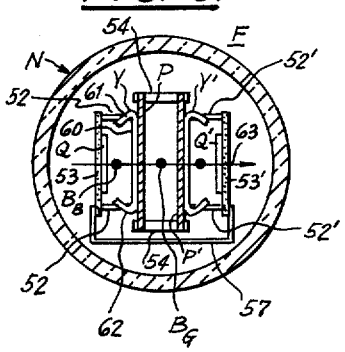
FIG. 6 is a transverse sectional view taken along line X—X of the tube of FIG. 5.

More specifically, as shown on FIGS. 5 and 6, such convergence deflecting means F may have its electrode plates P and P′ attached to the end surface of cylindrical grid $G_5$ through conductive angle members 51 and 51′, respectively. Electrode plates Q and Q′ are attached to insulating members 53 and 53′ mounted on support pins 52 and 52′ extending from the electrode plates P and P′ respectively. Further, a brush or coil spring member 55 is secured to a bracing member 54 bridging the free ends of electrode plates P and P′ so as to maintain a spacing between these electrode plates. Member 55 is in electrical contact with a conductive layer 56 extending over the inner surface of the neck portion N, and to which an anode voltage $V_p$ is applied by way of an anode button (not shown). Hence, such anode voltage is applied to electrode plates P and P′. Plates Q and Q′ are connected with each other through a conductor wire 57, and a conductor wire 59 extends from electrode plate Q for example to a button 58 provided in the neck portion N for example, so that a voltage that is 200 to 300 v. lower than anode voltage $V_p$ can be thereby applied to electrode plates Q and Q′.

In accordance with this invention, the magnetic correcting field is provided by mounting magnetic yoke members Y and Y′ on the outer surfaces of electrode plates P and P′, respectively, adjacent angle members 51 and 51′. Each of these magnetic yoke members Y and Y′ may include a flat or straight portion 60 extending across the corresponding electrode plate P or P′, and bent end portions 61 and 62 which extend outwardly from the opposite ends of straight portion 60.

With such an arrangement, magnetic leakage flux from the vertical deflection field produced by deflection yoke means 20 can pass through the opposing magnetic yoke members Y and Y′, as indicated by the arrows 63 on FIG. 5. It is obvious that because of the described configuration of magnetic yoke members Y and Y′, the field distribution density in the space between straight portions 60, and through which center beam $B_G$ passes is higher than the field distribution densities in the portions through which side beams $F_R$ and $F_B$ pass, as shown in FIG. 6. If it is assumed that the vertical deflection magnetic flux enters at magnetic yoke member Y, it will be apparent that the leakage flux occurring outside magnetic yoke member Y will be collected thereby and the magnetic flux thus collected will arrive at magnetic yoke member Y′, and then be expanded.

Where each of magnetic yoke members Y and Y′ is provided with the bent portions 61 and 62, the magnetic flux densities between such bent portions 61 and 62 are lower than the magnetic flux density between straight portions 60 thereof. In this way, the vertical deflection of center beam $B_G$ is increased more than the vertical deflections of side beams $B_R$ and $B_B$. Thus, it is possible to eliminate deviations of the position of center beam $B_G$ from the positions of side beams $B_R$ and $B_B$. Consequently, rasters $L_R$, $L_G$, and $L_B$ resulting from beams $B_R$, $B_G$, and $B_B$ can appear substantially along the common horizontal line U.

The above described corrective effect can be produced merely by providing magnetic yoke members Y and Y′ at the entry to convergence means F. Furthermore, the magnetic correcting field needed for assisting the vertical deflection of the center beam can be obtained from the leakage component of the vertical deflection field produced by deflection yoke means 20. Therefore, there is no need to provide any special electromagnetic means to produce the deflection correcting field.

Figure 7:
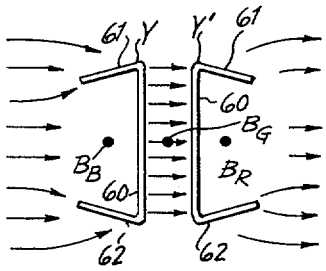
FIG. 7 is a diagrammatic view showing the magnetic field distribution occuring in the embodiment of the invention illustrated by FIGS. 5 and 6.

[Although the leakage component of the vertical deflection field is used for aiding the vertical deflection of the center beam in the described embodiment, it will be apparent that it is also possible to produce the aforementioned effect by providing additional, external electromagnet means or permanent magnet means to produce magnetic flux in yoke members Y and Y′. Such additional external magnet means would be secured along neck portion N and arranged to produce the pattern of field densities across yoke members Y and Y′ as shown in FIG. 7.]

In the above description of the invention, it has been assumed that the yoke members Y and Y' according thereto are employed to correct a deviation of the raster of center beam $B_G$ from the rasters of side beams $B_R$ and $B_B$ that may remain even when the horizontal and vertical deflection coils are given the configuration described with reference to FIGS. 2A and 2B. However, it will be appreciated that, when the horizontal and vertical deflection coils are not given the configuration of FIGS. 2A and 2B, the yoke members Y and Y' can be still employed to correct the aforementioned deviation between the rasters of the three electron beams.

Further, the application of the present invention is not limited to the tube arrangement of FIG. 1, wherein plural beams are made to cross each other at the center of a main focussing lens of a single electron gun and subsequently pass through convergence deflecting means to converge with each other at the screen.

Although the invention has been described as applied to a color cathode ray tube having a single common cathode, and three separate first grids, it is to be understood that the present invention can be equally applied to a color cathode ray tube including three separate cathodes and a single first grid formed with three apertures through which the three beams can pass respectively. Furthermore, it will be appreciated that the invention also can be applied to any color cathode ray tube in which the three beams originate in a horizontal plane and enter into the field produced by horizontal-vertical deflection yoke means at predetermined incident angles to each other, but without crossing each other at the optical center of a main focussing lens, as in FIG. 1.

In the described embodiment of the invention, the three beams originate in a horizontal plane. However, these three beams may originate in a vertical plane, in which case the horizontal deflection coils should be wound in a saddle-like form to produce a barrel shaped horizontal deflection field, and the vertical deflection coils should be wound in a toroidal form to produce a pin-cushion shaped field. Furthermore, in such a case, the direction in which the phosphor stripes of the screen, and the grid wires of the grid extend should be changed to the horizontal direction, and the convergence deflecting means F is turned through 90° to effect convergence of side beams $B_B$ and $B_R$ vertically toward center beam $B_G$.

It will be readily appreciated that the present invention can also be applied to a cathode ray tube of the shadow-mask type wherein a shadow-mask is provided in place of the grid shown on FIG. 1 in opposing relationship to the screen.

Having described a particular embodiment of the invention with reference to the accompanying drawings, it will be understood that the invention is not limited to such precise embodiment, and that various changes and modifications, only some of which have been mentioned above, may be made therein without departing from the scope or spirit of the invention.

What is claimed is:

1. In a color cathode ray tube having means generating plural beams including a central beam and opposite side beams which originate in a common plane and which are directed, at predetermined incident angles to each other for convergence on a screen, through horizontal and vertical deflection fields produced by electromagnetic deflection means and by which said beams are made to scan said screen, the improvement comprising magnetic yoke means disposed *in advance of said electromagnetic deflection means to be in advance of all but the leakage flux of at least one field from the same and* wholly within said tube adjacent the paths of said beams through said deflection fields and being operative to collect *said* leakage flux from one of said fields and to concentrate the collected leakage flux in a correction field through which only said central beam passes for correcting deviations between the rasters of said plural beams on said screen.

2. A color cathode ray tube according to claim 1, in which said magnetic yoke means includes two spaced apart yoke members disposed at opposite sides of the path of said central beam and being shaped to collect said leakage flux for concentration in the space between said yoke members.

3. A color cathode ray tube according to claim 2, in which each of said yoke members includes a substantially straight portion extending substantially parallel to and in spaced relation to the straight portion of the other yoke member, and end portions at the ends of said straight portion and being directed at substantial angles to the latter in the direction away from said space between the yoke members.

4. A color cathode ray tube according to claim 3, in which said common plane is horizontal and said straight portions of the yoke members extend substantially vertically so that said yoke members collect and concentrate said leakage flux from said vertical deflection field.

5. In a single-gun, plural-beam color picture tube which includes a color screen having arrays of color phosphors and beam selecting means provided with apertures corresponding to said arrays, beam generating means for directing a central electron beam and two side electron beams in a common plane toward said screen for impingement on respective phosphors of each array through the corresponding aperture, lens means for focussing said electron beams on said screen and having an optical center at which said beams are made to cross each other with said side beams emerging from said lens means along paths lying in said plane and which are divergent with respect to the central beam, electron beam convergence deflecting means operative, upon the application of a convergence deflecting voltage thereto, to deflect said side beams emerging along said divergent paths for convergence of all of said beams at an aperture of said beam selecting means, and deflection yoke means having sweep signals applied thereto to provide fields which deflect said beams in directions respectively parallel, and at right angles to said plane for causing said beams to scan said screen; the improvement comprising magnetic yoke means disposed *in advance of said deflection yoke means to be in advance of all but the leakage flux of at least one field from the same and* wholly within said tube and collecting *said* leakage flux from said field which deflects said beams in said direction at right angles to said plane and concentrating the collected leakage flux in a correction field through which said central beam passes for correcting deviations between the positions of the rasters on the color screen produced by said beams in scanning said screen.

6. A single-gun, plural-beam color picture tube according to claim 5, in which said magnetic yoke means includes spaced apart yoke members arranged at opposite sides of said central beam and each having a substantially straight portion at right angles to said plane between said central beam and one of said side beams and end portions at the ends of said straight portion and being directed at substantial angles to the latter in the direction away from the other yoke member so that said end portions act as pole pieces to collect said leakage flux for concentration in said correction field established between said straight portions of the yoke members.

7. A single-gun, plural-beam color picture tube according to claim 6, in which said yoke members are mounted adjacent the entry end of said convergence deflecting means.

*8. In a color cathode ray tube having means generating plural beams including a central beam and opposite side beams which originate in a common horizontal plane and which are directed, at predetermined incident angles to each other for convergence on a screen, through pincushion-shaped horizontal and barrel-shaped vertical deflection fields produced by electromagnetic deflection means and by which said beams are made to scan said screen, the improvement comprising magnetic yoke means disposed in advance of said electromagnetic deflection means wholly within said tube adjacent the paths of said beams through said deflection fields and being operative to collect leakage flux from one of said fields and to concentrate the collected leakage flux in a correction field through which only said central beam passes for correcting deviations between the rasters of said plural beams on said screen without substantially affecting the pincushion and barrel-shapes of said horizontal and vertical deflection fields.*

*9. In a single-gun, plural-beam color picture tube which includes a color screen having arrays of color phosphors and beam selecting means provided with apertures corresponding to said arrays, beam generating means for directing a central electron beam and two side electron beams in a common plane toward said screen for impingement on respective phosphors of each array through the corresponding aperture, lens means for focusing said electron beams on said screen and having an optical center at which said beams are made to cross each other with said side beams emerging from said lens means along paths lying in said plane and which are divergent with respect to the central beam, electron beam convergence deflecting means operative, upon the application of a convergence deflecting voltage thereto, to deflect said side beams emerging along said divergent paths for convergence of all of said beams at an aperture of said beam selecting means, and deflection yoke means having sweep signals applied thereto to provide pincushion-shaped and barrel-shaped fields which deflect said beams in directions respectively parallel, and at right angles to said plane for causing said beams to scan said screen; the improvement comprising magnetic yoke means disposed in advance of said deflection yoke means wholly within said tube and collecting leakage flux from said field with deflects said beams in said direction at right angles to said plane and concentrating the collected leakage flux in a correction field through which said central beam passes for correcting deviations between the positions of the rasters on the color screen produced by said beams in scanning said screen without substantially affecting the pincushion- and barrel-shapes of said fields provided by said deflection yoke means.*

* * * * *